United States Patent [19]

Fukumaru et al.

[11] Patent Number: 4,967,339
[45] Date of Patent: Oct. 30, 1990

[54] OPERATION CONTROL APPARATUS FOR A PROCESSOR HAVING A PLURALITY OF ARITHMETIC DEVICES

[75] Inventors: Hiroaki Fukumaru; Soichi Takaya; Takayuki Morioka, all of Hitachi; Tadaaki Bandoh, Ibaraki; Shinichiro Yamaguchi, Hitachi; Kenji Hirose, Hitachi, all of Japan

[73] Assignees: Hitachi, Ltd., Tokyo; Hitachi Engineering, Ltd., Hitachi, both of Japan

[21] Appl. No.: 179,554

[22] Filed: Apr. 8, 1988

[30] Foreign Application Priority Data

Apr. 10, 1987 [JP] Japan ............................ 62-86897

[51] Int. Cl.5 .................... G06F 9/38; G06F 9/30; G06F 12/00; G06F 7/00
[52] U.S. Cl. ............................... 364/200; 364/900; 364/258; 364/263; 364/231.8; 364/937.1; 364/923.5; 364/948.34; 364/946.2
[58] Field of Search ... 364/200 MS File, 900 MS File, 364/736

[56] References Cited

U.S. PATENT DOCUMENTS

| | | | |
|---|---|---|---|
| 4,152,763 | 5/1979 | Shimoi | 364/200 |
| 4,434,459 | 2/1984 | Holland et al. | 364/200 |
| 4,594,655 | 6/1986 | Hao et al. | 364/900 |
| 4,616,313 | 10/1986 | Aoyagi | 364/200 |
| 4,626,989 | 12/1986 | Torii | 364/200 |
| 4,698,747 | 10/1987 | Thompson et al. | 364/200 |
| 4,766,566 | 8/1988 | Chuang | 364/900 |

Primary Examiner—Michael R. Fleming
Assistant Examiner—Gopal C. Ray
Attorney, Agent, or Firm—Antonelli, Terry, Stout & Kraus

[57] ABSTRACT

A processor performs a pipelined parallel processing by an operand effective address calculation unit for calculating an operand effective address necessary to execute an instruction and an instruction execution unit for executing the instruction. A 64 bit width data operation is performed in such a way that a high order 32 bit operation is performed in an arithmetic device in the operand effective address unit and a low order 32 bit operation is performed in another arithmetic device in the instruction execution unit. A carry is transferred from the low order 32 bit arithmetic device to the high order 32 bit arithmetic device. The arithmetic devices thus joined can perform the 64 bit with data operation as an arithmetic device.

4 Claims, 5 Drawing Sheets

OPERATION CONTROL APPARATUS FOR A PROCESSOR HAVING A PLURALITY OF ARITHMETIC DEVICES

BACKGROUND OF THE INVENTION

This invention relates to a processor in which pipelined parallel processing is performed by an operand effective address arithmetic unit for calculating the operand effective address necessary to execute an instruction and an instruction execution unit for performing the operation of the instruction, and more particularly to a processor which is suitable to perform an operation with a larger bit width than a basic arrangement at a high speed.

In a case where an operation is to be performed for data with a data length being longer than a basic part, e.g. the operation of 64 bit data is to be performed by a basic arithmetic unit for 32 bit data, previously known processors time-divisionally operate high order 32 bit data and low order 32 bit data, or, as disclosed in JP-A-59-201145, adds another arithmetic unit for expansion to the basic arithmetic unit so as to constitute a new arithmetic unit for 64 bit data.

However, the former example takes a very long time in performing the operation of the data length exceeding that of the basic arithmetic unit, and the latter example requires increased hardware although it can process 64 bit data at a time.

A processor in which the calculation of the effective address of an operand and the execution of an instruction are performed in a pipelined fashion, in order to implement the pipelined processing, causes individual controllers to individually operate the address arithmetic unit and the instruction execution unit. As mentioned above such a pipeline system processor, if the arithmetic unit for instruction execution is for 32 bits, operates 64 bit data in such a manner that the 64 bit data is divided into high order 32 bits and low order 32 bits which are individually operated by the 32 bit arithmetic unit. In this case, in order to obviate the increase of operation time, the prior art pipeline processor is provided with another 32 bit arithmetic unit to permit the data length of 64 bits to be processed by the entire arithmetic unit. However, this leads to the undesired increase of hardware (twice in the hardware of the arithmetic unit).

SUMMARY OF THE INVENTION

An object of this invention is to provide a pipeline system processor which can process bit data of a data length longer than a basic arrangement of the processor at a high speed without increasing the hardware in the instruction execution unit thereof.

In order to attain this object, in accordance with this invention, there is provided a data processor in which operand effective address calculation and instruction execution are performed in a pipelined process, including a selector for selecting, as a signal for controlling an arithmetic device for the operand effective address calculation, either one of a control signal from a controller in an address calculation unit for the operand effective address calculation and another control signal from another controller from another arithmetic device in an instruction execution unit, a carry transfer gate for transferring a carry generated in the arithmetic device in the instruction execution unit to a carry input of the arithmetic device in the address calculation unit, and a signal line for sending an expansion operation enabling signal, output from the controller in the address calculation unit for causing the selector to select the control signal from the instruction execution unit and for enabling the carry transfer gate if an operation of the total data width in the both arithmetic devices (referred to an expansion operation) is to be performed, the signal line being turned on in performing the expansion operation by the both arithmetic devices.

In operation, if an instruction decoder decodes an instruction and provides an inactive time to the operand effective address calculation unit, the controller in the operand effective address calculation unit makes active a selector switching signal from the control signal of controlling the arithmetic device in the operand effective address calculation unit to the control signal output from the controller in the instruction execution unit. Thus, the arithmetic device in the address calculation unit is placed under control of the controller in the instruction execution unit. The carry transfer gate is enabled so that a carry can be transferred from the arithmetic device in the operand effective address calculation unit to that in the instruction execution unit. Thus, in the case where a 64 bit width data operation is performed in such a way that a high order 32 bit operation thereof is performed in the operand effective address calculation unit and a low order 32 bit operation thereof is performed in the instruction execution unit, the carry can be transferred from the low order 32 bit operation to the high order 32 bit operation and both arithmetic devices thus joined can perform the 64 bit width data operation as an arithmetic device.

The present invention also operates by providing apparatus for judging if the arithmetic device in the instruction execution unit must operate on data having a data length exceeding a predetermined bit width and an expanded bit width arithmetic logic unit constituted by the arithmetic devices in such a way that when the judging apparatus makes a judgement that the data length exceeds a predetermined bit width, the arithmetic device in the address calculation unit is used as an expanded arithmetic portion for the arithmetic device in the instruction execution unit.

DESCRIPTION OF THE PREFERRED EMBODIMENTS

Figure 2:
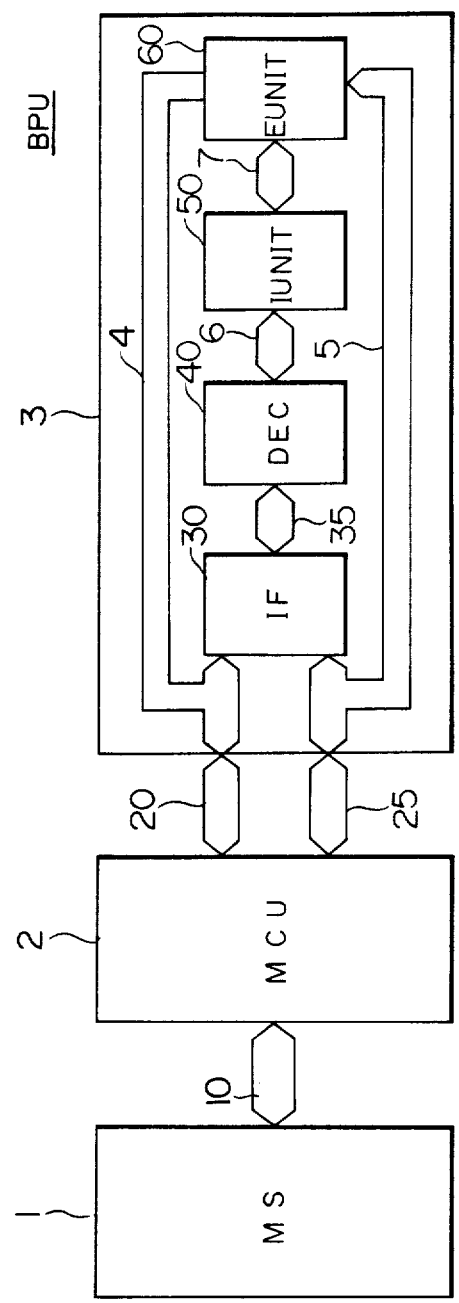
FIG. 2 is a block diagram of the entire arrangement of this invention.

FIG. 2 shows the entire arrangement of the processor using a pipelined processing system in accordance with this invention. The processor is constituted by a main storage (MS) 1, a memory control unit (MCU) 2, a basic processing unit (BPU) 3 and interface buses 10, 20 and 25 for interconnecting them.

The operation of these units will be explained.

BPU 3 sends an instruction address and a data address to MCU 2 through interface bus 20. Using these addresses, MCU 2 reads or writes the program or data from MS 1 through interface bus 10.

In the case of read, MCU 2 sends the data from MS 1 to BPU 3 through interface bus 25.

In the case of write from BPU 3 to MS 1, BPU 3 sends the address and data to MCU 2 through interface buses 20 and 25, respectively.

Using the address and data sent, MCU 2 writes the data in MS 1 through interface bus 10.

BPU 3 is constituted by an instruction fetch unit (IF) 30 for reading out an instruction stored in MS 1, an instruction decode unit (DEC) 40 for decoding the instruction read out, an operand address arithmetic unit (IUNIT) 50 for calculating the effective address of an operand using the decoded result, an instruction execution unit (EUNIT) 60 for executing the instruction using the operand and internal buses 4, 5, 6, 7 and 35 for interconnecting these units.

The operation of these units in executing an instruction will be explained.

IF 30 sends the address of an instruction to MCU 2 through internal bus 4 and interface bus 20. MCU 2 reads the instruction addressed by this address from MS 1 and sends it to IF 30 through interface bus 25 and internal bus 5. IF 30 sends the read instruction to DEC 40 through internal bus 35.

DEC 40 decodes the sent instruction and sends the address information of an operand to IUNIT 50 through internal bus 6.

IUNIT 50 calculates the address of the operand and sends the result to EUNIT 60 through internal bus 7. EUNIT 60 sends the operand address to MCU 2 through internal bus 4 and interface bus 20.

MCU 2 reads the data corresponding to the address and sends it to EUNIT 60 through interface bus 25 and internal bus 5. EUNIT 60 performs the operation of the instruction using this operand.

One embodiment of this invention will be explained in detail.

Figure 1:
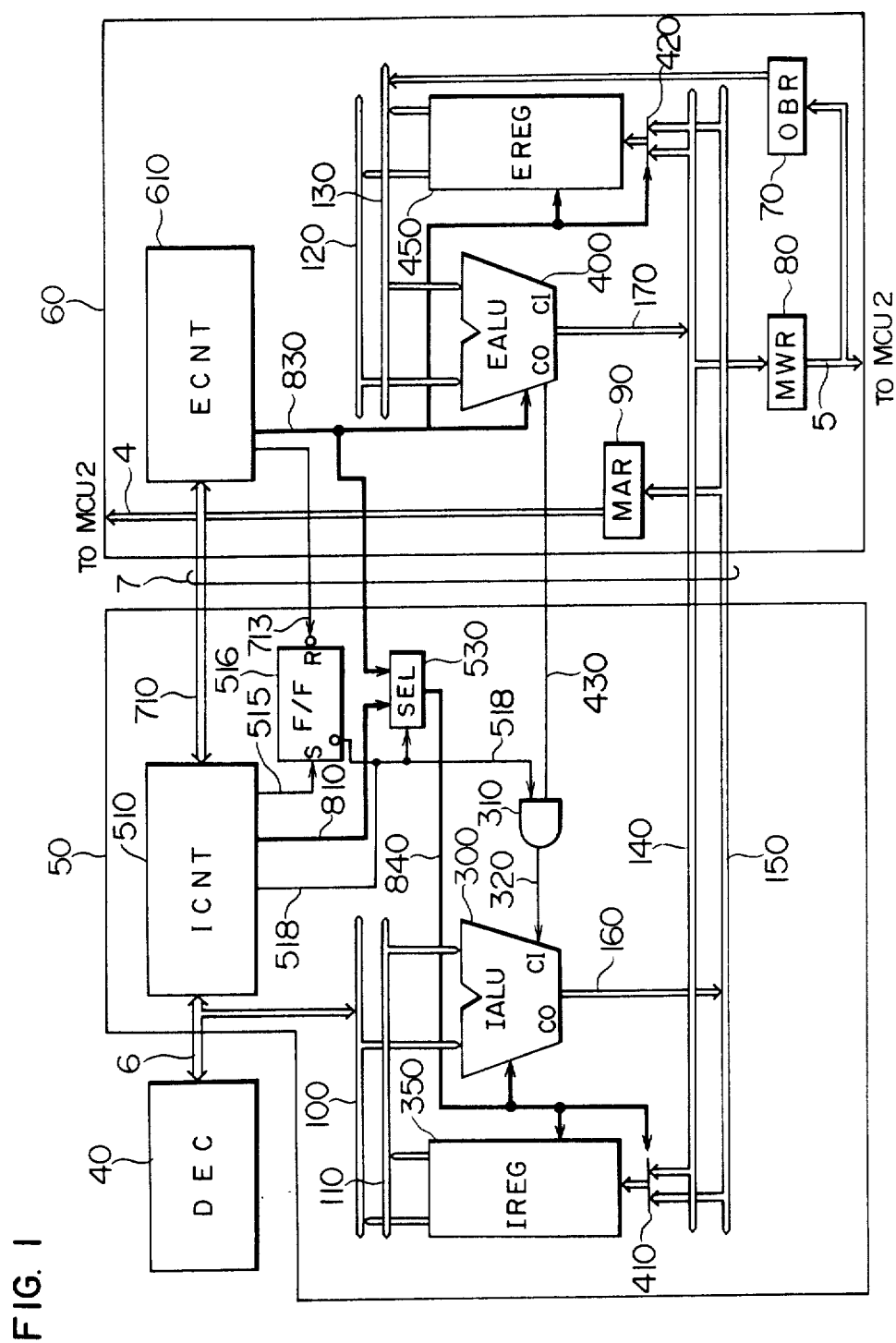
FIG. 1 is a block diagram of the hardware arrangement according one embodiment of this invention.

FIG. 1 shows the detailed arrangements of IUNIT 50 and EUNIT 60.

IUNIT 50 is constituted by a 32 bit I unit arithmetic logic unit (IALU) 300 for address calculation; an internal register (IREG) 350; a controller (ICNT) 510 for controlling the address calculation in IUNIT 50; a selector 410 for selecting an input data to IREG 350, a carry transfer gate 310 for transferring the carry from a 32 bit arithmetic logic unit (EALU) 400 for instruction execution in EUNIT 60 to IALU 300; a selector (SEL) 530 for selecting the data controlling the aforesaid IALU 300, IREG 350 and selector 410, a flip-flop (F/F) 516 for controlling the switching of SEL 530; internal buses 100, 110, 140 and 150 used for address calculation; and control signal lines 518, 515, 810 and 840.

EUNIT 60 is constituted by the aforesaid EALU 400; a internal register (EREG) 450; an controller (ECNT) 610 for controlling the instruction execution in EUNIT 60; a selector 420 for selecting an input data to EREG 450; a memory address register (MAR) 90 for sending an address for operand fetch to MCU 2; a memory write register (MWR) 80 for sending the data to be written in MS1 to MCU 2; an operand buffer register (OBR) 70 for receiving an operand data from MCU 2; internal buses 120, 130, 140, 150 used for instruction execution; a control signal line 830 for controlling the instruction execution in EUNIT 60; and a control signal line 713 for controlling FF 516 in IUNIT 50. Additionally, the address used for memory access to MCU 2 may be created in EUNIT 60. A memory address register, etc. used in this case are omitted in FIG. 1.

Figure 3:
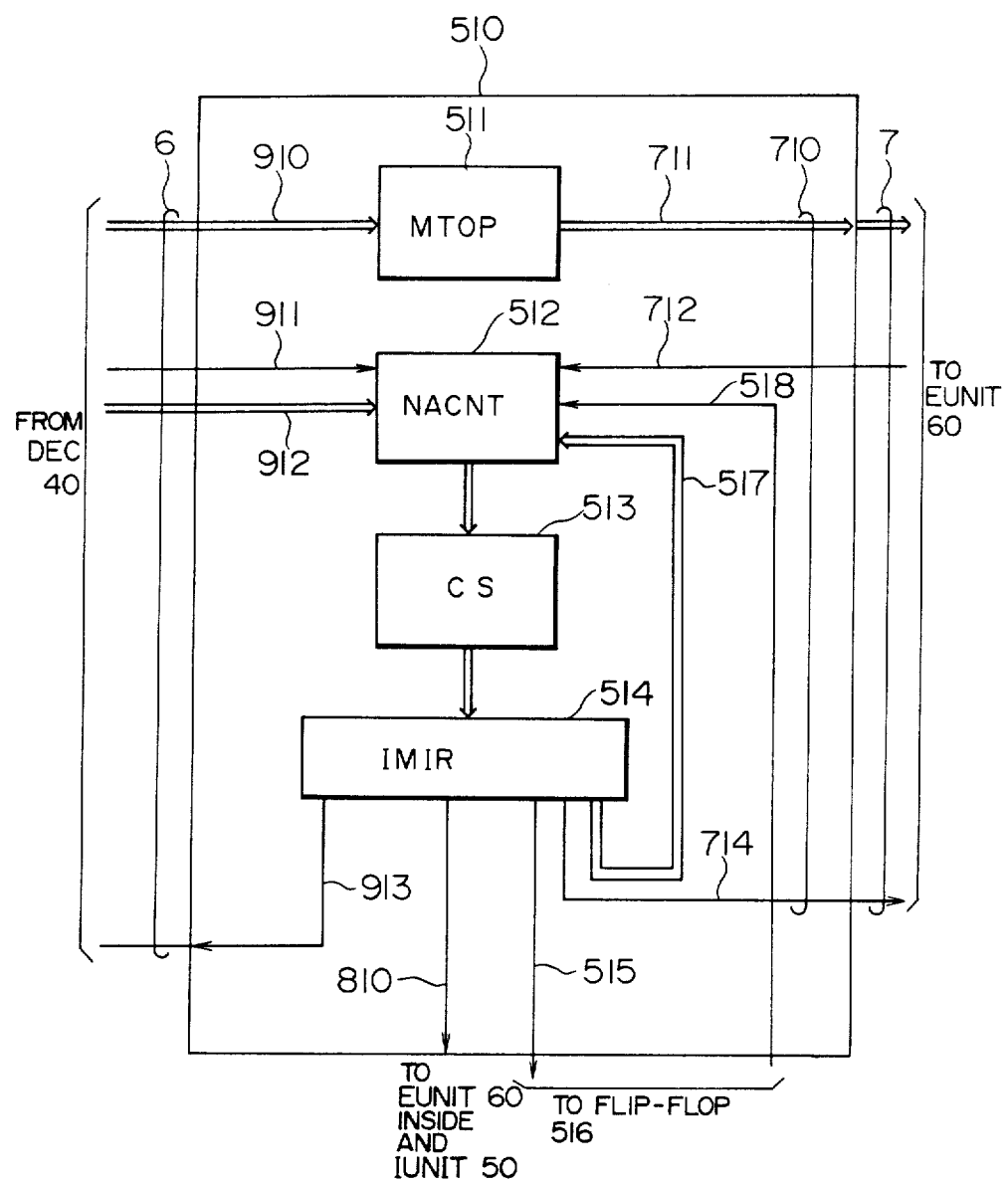
FIG. 3 is a detailed block diagram of one embodiment of a controller in the address calculation unit shown in FIG. 1.

FIG. 3 shows the detail of ICNT 510.

ICNT 510 is constituted by a microprogram top address register (MTOP) 511 for storing the microprogram address in ECNT 610 sent from DEC 40; a control storage (CS) 513 for storing a microprogram; an address creation circuit (NACNT) for creating the address of CS 513, a micro instruction register (IMIR) 514 for storing the output data from CS 513; data buses and control signal lines as illustrated.

A data bus 910 serves to receive the microprogram address to be stored in ECNT 610 from DEC 40. The microprogram address is set in MTOP 511 and sent to EUNIT 60 through a data bus 711. EUNIT 60 receives the microprogram address and executes an instruction under microprogram control. A signal line 912 serves to send the top address corresponding 60 one address calculation in CS 513 from DEC 40. A signal line 911 serves to indicate if signal line 912 is valid or not. A signal line 712 serves to indicate that EUNIT 60 has received the microprogram address through data bus 711.

A signal line 517 serves to indicate the microprogram address to be executed next to CS 513.

A signal line 913 serves to indicate that IMIR 514 has received the microprogram address of CS 513 from DEC 40.

A signal line 310 serves to control the address calculation in IUNIT 50 and is connected with SEL 530.

A signal line 515 serves to set F/F 516 which produces a signal 518 for controlling selector 530, carry transfer gate 310 and NACNT 512.

Figure 4:
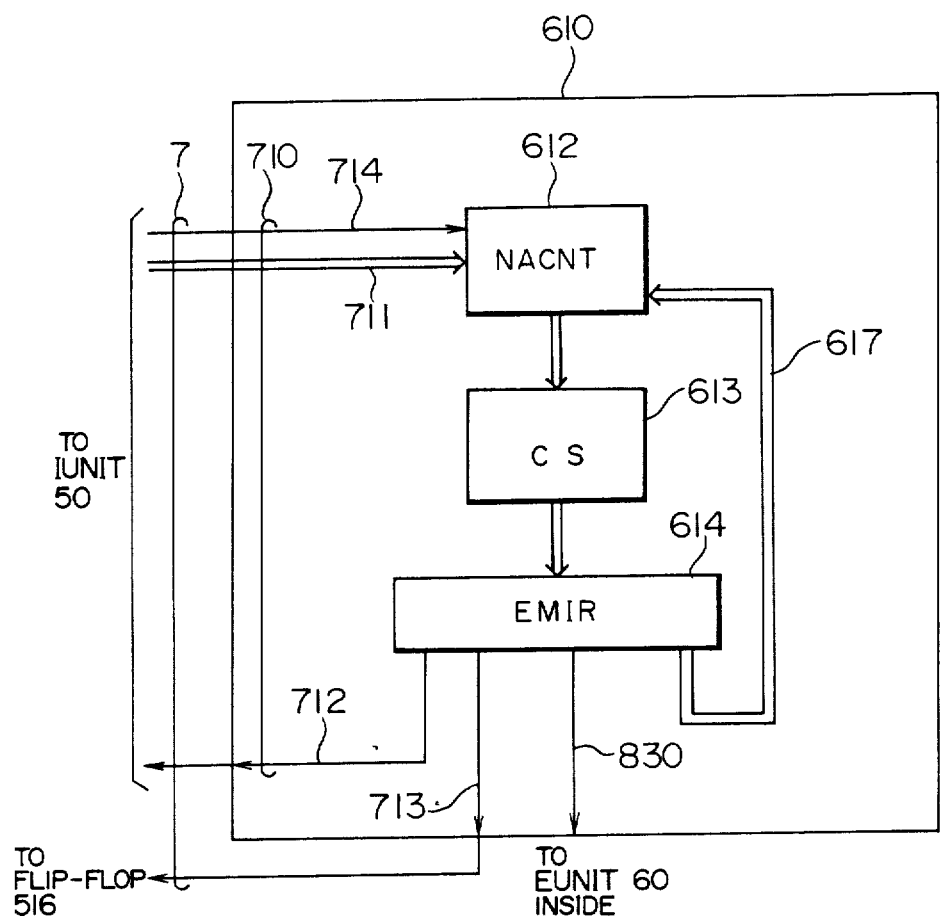
FIG. 4 is a detailed block diagram of one embodiment of a controller in the instruction execution unit shown in FIG. 1.

FIG. 4 shows the details of ECNT 610.

ECNT 610 is constituted by a control storage (CS) for storing a microprogram for controlling EUNIT 60; an address creation circuit (NACNT) 612 for creating the microprogram address of CS 613; a micro instruction register (EMIR) 614 for storing the output data from CS 613. and internal signal lines as illustrated.

The relation between data bus 711 and control signal lines 714 and 712 are as mentioned above. A signal line 617 serves to indicate the microprogram address to be executed next to CS 613. A signal line 713 serves to reset the aforesaid F/F 516. A signal line 830, serving to control the operation inside EUNIT 60, is connected with the aforesaid selector 530 in IUNIT 50 as well as EALU 400, EREG 450 and selector 420 in EUNIT 60, as shown in FIG. 1.

The operation of IUNIT 50 and EUNIT 60 when an instruction is being executed in a pipelined fashion will be explained.

IUNIT 50 receives the address information of an operand from DEC 40 or reads out it from IREG 350 and inputs it through internal bus 100 or 110 to IALU 300 in which the address calculation is performed.

When IUNIT 50 and EUNIT 60 are operating in parallel in a pipelined processing, F/F 516 is reset, selector 530 is switched to select output 810 from ICNT 510 by the output signal 518 from F/F 516, and carry transfer gate 310 is disabled. Thus, IALU 300, IREG 350 and selector 410 are controlled b the output signal line 810 from ICNT 510.

Likewise, the operation inside EUNIT 60 is controlled by the output signal line 830 from ECNT In this way, when IUNIT 50 and EUNIT 60 are operating in parallel in a pipelined fashion, the respective arithmetic units are controlled by the corresponding controllers, i.e. ICNT 510 and ECNT 610. The other signal lines (e.g., 712, 913) relative to the data transfer in a pipeline system, as explained in FIGS. 3 and 4, are not directly related with the technical concept of this invention, and also their operation can be easily inferred from the well known pipeline system processor. Therefore, the explanation thereof will be omitted here.

In such an arrangement, when a 64 bit operation is to be executed by EUNIT 60, the prior art causes EALU 400 to execute the operation of the data sectioned into 32 bit data at a plurality of times. While EALU 400 is executing the operation, IUNIT 50 can not send the instruction to be subsequently executed and the operand address to be subsequently used to EUNIT 60, and so ICNT 510 and IALU 300 are in inactive state.

This inactive state is illustrated in FIG. 5(a).

Figure 5:
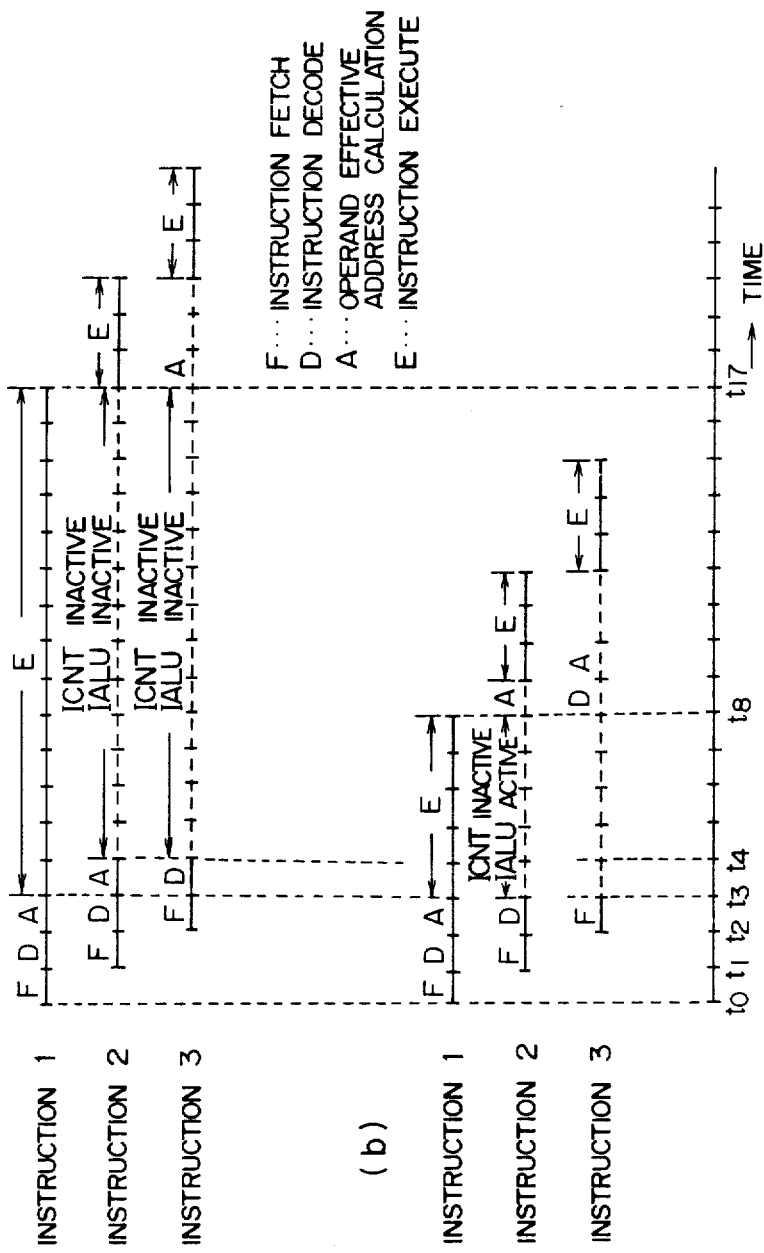
FIG. 5 is a time chart of the pipelined processing in executing an instruction.

FIG. 5 shows the manner that instructions 1, 2 and 3 are executed in a pipelined fashion with the horizontal axis of time. The respective contents represented by symbols used in FIG. 5 are as follows.

F: instruction fetch (performed by IF 30)
D: instruction decode (performed by DEC 40)
A: operand effective address calculation (performed by IUNIT 50)
E: instruction execution (performed by EUNIT 60)

The instruction 1 in FIG. 5(a) is an instruction including the 64 bit operation, as mentioned above. When this 64 bit operation of the instruction 1 is performed (i.e. the period from $t_3$ to $t_{17}$), the processing of the instruction 2 can be progressed to the address calculation but not further progressed since EUNIT 60 is executing the instruction 1 during the above period. Thus, ICNT 510 and IALU 300 in IUNIT 50 are in an inactive state during the period from $t_4$ to $t_{17}$. The instruction 2 will be executed subsequently to the completion ($t_{17}$) of the execution of the instruction. When the instruction 2 is being executed, the operand effective address calculation of the instruction 3 will be performed.

Hereafter, the method for performing the 64 bit operation using both IALU 300 and EALU 400, which is the technical idea of this invention, will be explained with reference to FIGS. 1, 3, 4 and 5(b).

When DEC 40 decodes the instruction including a 64 bit operation such as the instruction 1 shown in FIG. 5(a), it creates, for ICNT 510 shown in FIG. 1, the microprogram in ICNT 510 for controlling the inside of IUNIT 50 so that IALU 300 can be controlled from ECNT 610. This microprogram in ICNT 510 sets F/F 516 after the operand address calculation of the instruction 1 has been completed.

The output signal 518 from F/F 516 permits SEL 530 to select the control signal 830 from ECNT 610 and carry transfer gate 310 to be enabled. Thus, IALU 300 and IREG 350 will be controlled by the control signal 830. In performing the 64 bit operation, the respective high order 32 bits of 64 bit operand data and 64 bit operation data are previously set in two entries of IREG 350 and the respective low order 32 bits thereof are also previously set in the corresponding two entries of EREG 450. Then, the high order 32 bit operation and the low order 32, bit operation are simultaneously performed in IALU 300 and EALU 400, respectively. If EALU 400 performing the low order 32 bit operation generates a carry in the operation result, the carry is transferred to IALU 300 through carry transfer signal line 430, carry transfer gate 310 and signal line 320.

Thus, IALU 300 and EALU 400 operate as one 64 bit arithmetic unit 60 set the high order 32 bits of the operation result in IREG 350 through output bus 160 of IALU 300, internal bus 150 and selector 410 and set the low order 32 bits thereof in EREG 450 through output bus 170 of EALU 400, internal bus 140 and selector 420. Such an operation can be referred to as an expanded operation system.

A time chart of the above 64 bit operation is that relative to the instruction 1 in FIG. 5(b).

The 64 bit operation in the instruction 1 is performed in the aforesaid expanded operation system during the period from $t_3$ to $t_8$ which is smaller than $\frac{1}{2}$ of the execution time (E) of the instruction 1 in FIG. 5(a). When the instruction 1 is being executed, ICNT 510 is in an inactive state but IALU is in an active state as mentioned above.

After the completion of the 64 bit operation, ECNT 610 resets F/F 516 through signal line 713 shown in FIG. 1. This turns off control signal line 518 and causes selector 530 to select the control signal 810 from ICNT 510 and carry transfer gate 310 to be disabled. Thus, the operation of IUNIT 50 is resumed to provide the original pipeline state.

In accordance with this invention, in a processor in which an operand address calculation unit and an instruction execution unit operate in parallel in a pipelined fashion, the operation of the data with a length exceeding the data length which the arithmetic unit in the instruction execution unit can operate can be performed at a high speed without further adding hardware.

We claim:

1. An operation control apparatus for a processor including an address calculation unit having an arithmetic device for calculating an effective address of an operand and an instruction execution unit having another arithmetic device for executing an instruction in a pipeline processing, said instruction execution unit performing execution of an instruction based on an effective address delivered from said address calculation unit, and said address calculation unit calculates, after delivery of said effective address to said instruction execution unit, an effective address of an operand of an instruction to be executed next, said apparatus comprising:

means for judging if the arithmetic device in said instruction execution unit must operate on data having a data length exceeding a predetermined bit width; and an expanded bit width arithmetic logic unit constituted by said arithmetic devices in such a way that when said judging means makes a judgement that the data length exceeds a predetermined bit width, the arithmetic device in said address calculation unit is used as an expanded arithmetic portion for the arithmetic device in said instruction execution unit.

2. An operation control apparatus for a processor including an address calculation unit having an arithmetic device for calculating an effective address of an operand and an instruction execution unit having another arithmetic device for executing an instruction in a pipeline processing, said instruction execution unit performing execution of an instruction based on an effective address delivered from said address calculation unit, and said address calculation unit calculates, after delivery of said effective address to said instruction execution unit, an effective address of an operand of an instruction to be executed next, said apparatus comprising:

- selector means for receiving a plurality of control signals and selecting one of said control signals for controlling the arithmetic device in said address calculation unit, said control signals including a control signal from a controller in said address calculation unit and another control signal from another controller in said instruction execution unit; and
- an expanded bit width arithmetic logic unit constituted by said arithmetic devices in such a way that when the arithmetic device in said instruction execution unit performs an operation on data having a data length exceeding a predetermined bit width, the arithmetic device in said address calculation unit is controlled by said control signal from the controller in said instruction execution unit, said control signal being selected by said selector means.

3. An operation control apparatus for a processor including an address calculation unit having an arithmetic device for calculating an effective address of an operand and an instruction execution unit having another arithmetic device for executing an instruction in a pipeline processing, said instruction execution unit performing execution of an instruction based on an effective address delivered from said address calculation unit, and said address calculation unit calculates, after delivery of said effective address to said instruction execution unit, an effective address of an operand of an instruction to be executed next, said apparatus comprising:

- first means for receiving a plurality of control signals and selecting one of said control signals for controlling the arithmetic device in said address calculation unit, said control signals including a control signal from a controller in said address calculation unit and another control signal from another controller in said instruction execution unit;
- second means for inputting a carry from the arithmetic device in said instruction execution unit to the arithmetic device in said address calculation unit;
- third means for controlling which control signal is selected by said first means and for enabling or disabling said second means; and
- an expanded bit width arithmetic logic unit constituted by said arithmetic devices in such a way that when said instruction execution unit performs an operation on data having a data length exceeding an operation width in the arithmetic device in said instruction execution unit said third means causes said first means to select the control signal from the controller in said instruction execution unit and enables said second means.

4. An operation control apparatus for a data processor in which operand effective address calculation is performed by an address calculation unit and instruction execution is performed by an instruction execution unit in a pipelined processing, said instruction execution unit including an arithmetic device for performing execution of an instruction based on an effective address delivered from said address calculation unit and said address calculation unit includes arithmetic device for calculating, after delivery of said effective address to said instruction execution unit, an effective address of an operand of an instruction to be executed next, said apparatus comprising:

- a selector for receiving a plurality of control signals and selecting one of said control signals for effective address calculation, said control signals include a control signal from a controller in said address calculation unit and another control signal from another controller in said instruction execution unit;
- a carry transfer gate for transferring a carry generated in the arithmetic device in said instruction execution unit to a carry input of the arithmetic device in said address calculation unit; and
- a signal line for sending an expansion operation enabling signal, output from the controller in said address calculation unit, for causing said selector to select the control signal from said instruction execution unit and for enabling said carry transfer gate if an expansion operation of the total date width in said arithmetic devices is to be performed, said signal line being turned on in performing the expansion operation by said arithmetic devices.

* * * * *